(12) United States Patent
Ben Rached et al.

(10) Patent No.: US 7,962,177 B2
(45) Date of Patent: Jun. 14, 2011

(54) TRANSMISSION METHOD AND RELATED BASE STATION

(75) Inventors: Nidham Ben Rached, Paris (FR); Thierry Lucidarme, Montigny le Bretonneux (FR); Arnaud de Lannoy, Versailles (FR)

(73) Assignee: Nortel Networks Limited, Mississauga, ON (CA)

( * ) Notice: Subject to any disclaimer, the term of this patent is extended or adjusted under 35 U.S.C. 154(b) by 984 days.

(21) Appl. No.: 11/528,825

(22) Filed: Sep. 28, 2006

(65) Prior Publication Data

US 2007/0117591 A1   May 24, 2007

(30) Foreign Application Priority Data

Nov. 21, 2005   (EP) .................................... 05292463

(51) Int. Cl.
*H04M 1/00* (2006.01)
(52) U.S. Cl. ..................... 455/562.1; 340/572.1; 342/82
(58) Field of Classification Search ............... 455/562.1, 455/73
See application file for complete search history.

(56) References Cited

U.S. PATENT DOCUMENTS

| | | | | |
|---|---|---|---|---|
| 5,757,285 A | * | 5/1998 | Grabow et al. | ............... 340/928 |
| 5,875,183 A | * | 2/1999 | Nitadori | ......................... 370/328 |
| 6,014,570 A | * | 1/2000 | Wong et al. | .................... 455/500 |
| 6,173,014 B1 | * | 1/2001 | Forssen et al. | ................. 375/267 |
| 6,198,458 B1 | | 3/2001 | Heinz et al. | |
| 6,456,225 B1 | * | 9/2002 | Forster | ............................. 342/12 |
| 6,480,154 B1 | | 11/2002 | Bella et al. | |
| 6,809,694 B2 | * | 10/2004 | Webb et al. | .................... 343/754 |
| 2004/0087294 A1 | | 5/2004 | Wang | |
| 2005/0042988 A1 | | 2/2005 | Hoek et al. | |
| 2006/0103535 A1 | * | 5/2006 | Pahlaven et al. | ........... 340/572.1 |

FOREIGN PATENT DOCUMENTS

| | | |
|---|---|---|
| EP | 1 003 297 | 5/2000 |
| GB | 2 237 706 | 5/1991 |
| WO | WO 95/06365 | 3/1995 |
| WO | WO 95/12927 | 5/1995 |

OTHER PUBLICATIONS

EP Search Report dated Apr. 13, 2006, pp. 1-2.

* cited by examiner

*Primary Examiner* — Phuoc Doan
(74) *Attorney, Agent, or Firm* — Barnes & Thornburg LLP (57) ABSTRACT

The invention relates to transmission from a base station to a receiver, the base station comprising first radiating means arranged for transmitting according to an antenna pattern with respect to the receiver and further comprising second radiating means arranged for transmitting according to the same antenna pattern as the first radiating means with respect to the receiver, the transmissions of the first and second radiating means being time shifted by a determined duration.

16 Claims, 6 Drawing Sheets

TRANSMISSION METHOD AND RELATED BASE STATION

BACKGROUND OF THE INVENTION

The present invention relates to transmission from a base station to a receiver.

It can apply to a base station of a radiocommunication network, such as a GSM ("Global System for Mobile communications") or a UMTS ("Universal Mobile Telecommunication System") network for instance. Of course, it can also apply to other types of base stations.

The receiver can be a mobile terminal, but also any other type of receiver, such as another base station, a base station controller, a radio network controller, etc.

It is known that communication by radio between a base station and a mobile terminal for instance, is subject to phenomena that disturb the radio transmission between the antenna of the base station and the antenna of the mobile terminal, in particular to channel fadings due to destructive interference between signals which follow different propagation paths between the base station and the terminal.

The diversity of one of the characteristics related to this transmission is one of the methods developed for alleviating fading. Thus, use is made of transmission diversity, consisting in equipping the base station with several antennas transmitting the same signals, polarization diversity, frequency diversity (see for example the work "Réseaux GSM" [GSM networks] by X. Lagrange et al, published by Hermes Science Publications, 2000, page 161), etc.

It is known practice to use antennas comprising devices for altering the radiation pattern. Such adjustments pertain for example to the direction of transmission of the antenna or the width of the main transmission lobe.

These alterations of the radiation pattern may be mechanical, such as the orienting of an antenna arranged on an articulated support, mixed electrical/mechanical (cf. U.S. Pat. No. 6,198,458), or else purely electronic, as in FR-A-2 792 116 or its US equivalent U.S. Pat. No. 6,480,154.

Most antennas with electronic steering of the beam are composed of several antenna elements individually fed with signals obtained by phase shifting an initial signal. The value of the phase shift is determined as a function of the antenna element to which the phase-shifted signal is addressed, and the direction of transmission by the antenna results from the combining of the mutually phase-shifted signals transmitted by all the antenna elements.

Such antennas, also known as "smart antennas", are sometimes used to focus a radio beam intended for a particular terminal. In a particular embodiment, the components of an uplink radio signal transmitted by the terminal and which are picked up by the various antenna elements, are analyzed in terms of phase shifts so as to estimate a direction in space from which this uplink signal originates. Corresponding phase shifts are then applied to the downlink signal intended for this terminal so that its transmission is oriented in this direction. Such electronic steering of the beam allows considerable reductions in interference level.

A base station with such antenna is described below with reference to FIG. 1 and FIG. 2.

Figure 1:
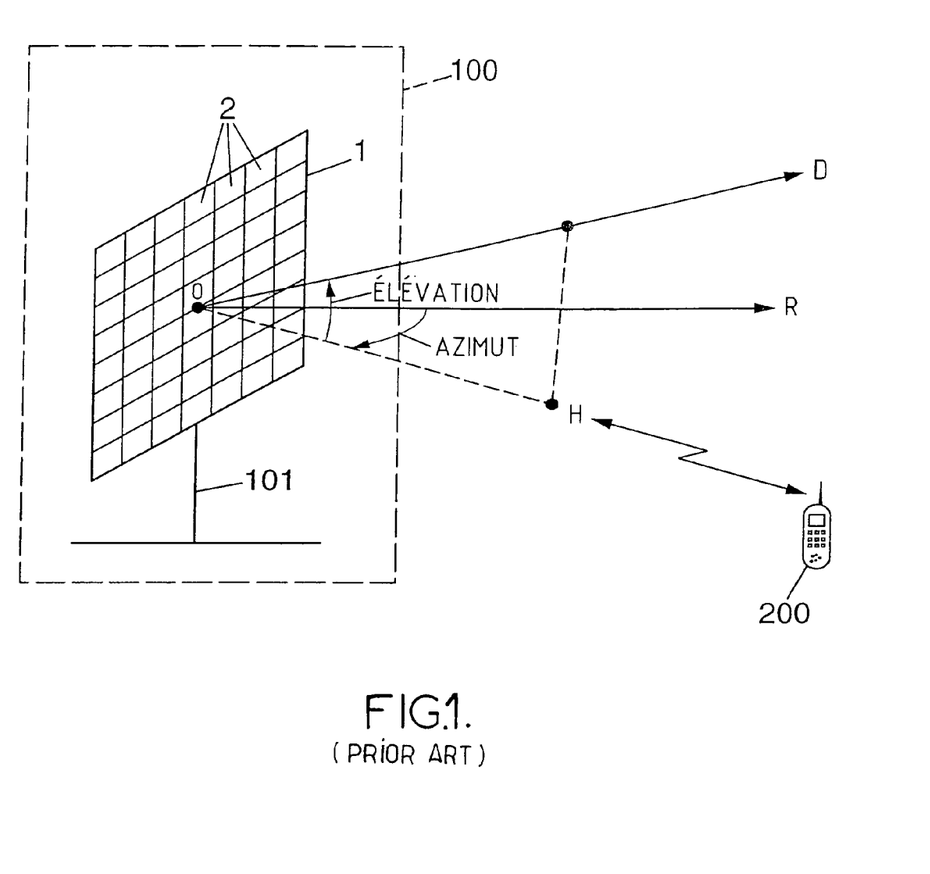
FIG. 1, already commented, represents a system of spherical coordinates making it possible to characterize a direction of transmission or reception of the antenna of a base station.

In FIG. 1, a base station 100 transmits by means of the antenna 1, a radio signal intended for a terminal 200 situated within range of this antenna. In this example, the antenna 1 consists of juxtaposed radiating elements 2. All these radiating elements 2 are fixed with respect to the support of the antenna 101, and oriented facing the geographical sector intended to be served by the antenna.

The transmission pattern of the antenna generally consists of a main lobe, corresponding to an angular sector inside which the radiation power is greater than a fixed value, and limited according to the separation with respect to the antenna by the reduction in power related to the propagation of the radiation. The axis of this main lobe corresponds to the direction D of transmission of the antenna 1.

The direction D of transmission can be charted by a system of spherical coordinates having as pole the centre O of the antenna 1. These coordinates comprise for example the angle of elevation of the direction D of transmission with respect to a horizontal plane containing the point O, and the angle of azimuth between the projection of the direction D onto the horizontal plane and a reference axis R contained in this plane, for example oriented perpendicularly to the grouping of radiating elements and passing through the point O.

Fluctuations in the direction D of transmission of the antenna 1, e.g. due to movement of the mobile terminal 200, are then charted through the evolution of the angles of elevation and of azimuth. Thus, a fluctuation in the direction D lying in a vertical plane corresponds to a variation in the angle of elevation. A fluctuation lying in a horizontal plane corresponds to a variation in the angle of azimuth.

In most digital radiocommunication systems, the signals are transmitted after application of a channel coding and of an interleaving. The channel coding adds redundancy to the symbols of the digital signal, with a structure allowing the receiver to detect and correct the transmission errors. The codes customarily employed have optimal performance when the errors arising in the course of transmission are uncorrelated. The interleaving consists of a permutation of the symbols that is intended to tend towards this condition of non correlation while the transmission errors on a radio interface have a tendency rather more to arise through packets on account of the fading phenomenon. The permutation of the interleaving pertains to a certain duration (of a few tens of milliseconds) chosen to achieve a compromise between the performance of the decoder and the processing delay which the interleaver entails. This interleaving duration may vary from one channel to another, such as for example in the case of a UMTS ("Universal Mobile Telecommunication System") system where it is from 10 to 80 ms.

Figure 2:
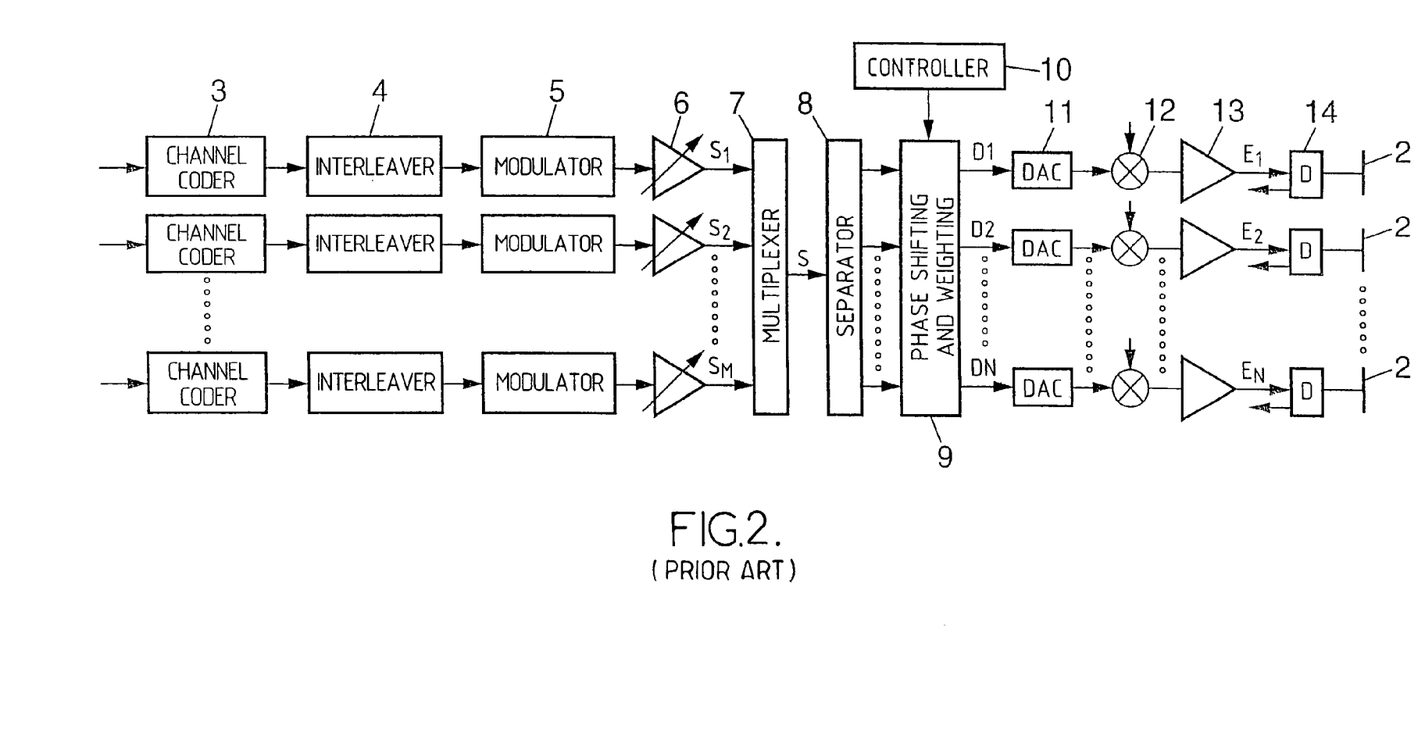
FIG. 2, already commented, illustrates a control of the direction of transmission of the antenna.

FIG. 2 diagrammatically shows an example of the means employed by a base station to adapt the antenna pattern, in order to focus it in a particular direction of transmission. Each signal component $S_1, S_2, \ldots S_M$, intended for a particular terminal 200 or one belonging to a common channel, is produced by a processing pathway comprising a channel coder 3, an interleaver 4, a modulator 5, then a power adjustment module 6. The signal components $S_1, S_2, \ldots, S_M$, delivered by the various processing pathways are subsequently combined by a multiplexing unit 7 into a baseband signal S delivered to the radio transmission stage.

The makeup of the modulators 5 and of the multiplexing unit 7 depends on the multiple access mode employed in the radiocommunication system to which the invention is applied. In a system where the multiple access is by time division (TDMA), as for example GSM, the modulators 5 carry out the modulation in baseband or on an intermediate frequency, whereas the multiplexer 7 distributes the signal components $S_1, S_2, \ldots, S_M$, into respective time slots of the signal frames, corresponding to the various channels. In a system where the multiple access is by code division (CDMA), such as for example UMTS, the modulators 5 can carry out the spectrum spreading by applying the spreading codes assigned to the various channels, whereas the multiplexer 7 simply performs a summation of the signal components $S_1, S_2, \ldots, S_M$.

In the radio stage, a separator 8 reproduces the signal S on each transmission pathway corresponding to a radiating element 2 of the antenna 1. The phase-shifting unit 9 then applies a respective phase shift $D_1, D_2, \ldots, D_N$ to the signal of each transmission pathway. Each phase shift is determined by the position in the antenna 1 of the radiating element 2, and depends on the direction of transmission of the antenna 1 controlled by the transmission pattern controller 10. FR-A-2 792 116 describes an exemplary phase adaptation device usable as a phase-shifting unit 9.

The radio stage subsequently undertakes the conventional operations of filtering, of conversion to analogue 11, of transposition to the carrier frequency 12 and of power amplification 13 on the basis of the signals delivered by the phase-shifting unit 9. Each radiating element 2 then receives from the amplifier 13 associated with it, by way of a duplexer 14, the phase-shifted radio signal $E_1, E_2, \ldots, E_N$ corresponding to its transmission pathway.

Alternatively, the phase shifts could be applied to the signal of each transmission pathway in an analogue way, i.e. after conversion to analogue 11.

The phase-shifting unit 9 can also perform a weighting of the amplitude of the signal corresponding to each transmission pathway. In a manner known to the specialist in radio transmissions, such a weighting, jointly with phase shift law applied, makes it possible to modify a width of the transmission pattern by altering the amplitudes of the signals transmitted by each radiating element 2. Thus, during the transmission of the signal by the antenna 1, the angular aperture of the transmission pattern can be modified simultaneously with the fluctuation of the direction of transmission D.

An important advantage of such smart antennas is to make it possible to maximize, for a given mobile terminal, the signal-to-interference ratio, by creating an antenna pattern whose "zeros", that is to say locations with very weak transmission or reception power, are in the direction of the interferers of the mobile terminal in question.

Figure 3:
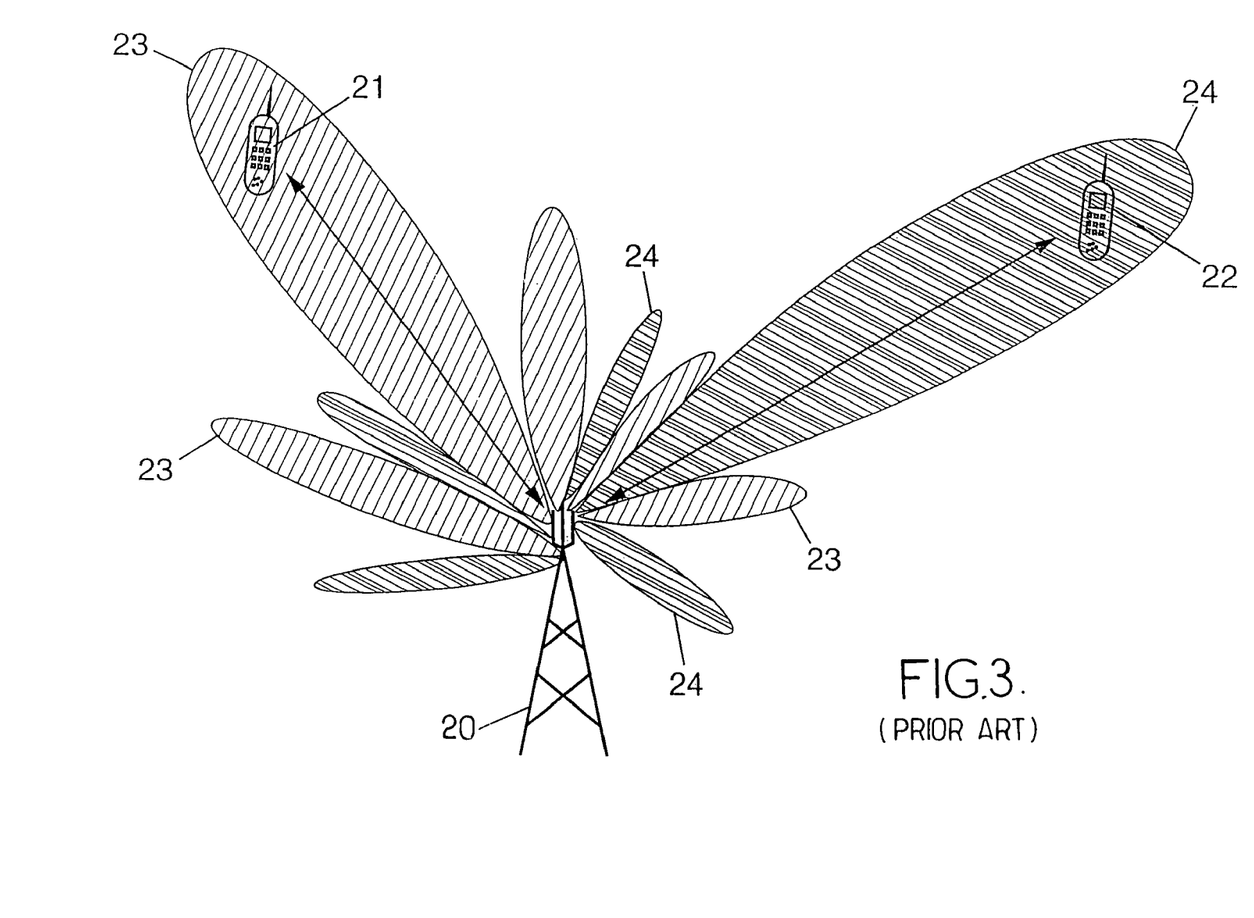
FIG. 3, already commented, is a diagrammatic representation of a smart antenna pattern.

This principle is illustrated in FIG. 3 where two terminals 21 and 22 are in communication with the base station 20. The lobes 23 and 24 of the antenna of the base station 20 are oriented mainly towards the two terminals 21 and 22 respectively. The figure clearly shows that the signal-to-noise ratio is maximized for each of the two terminals since the overlap of the lobes 23 and 24 is limited.

Theoretically and ideally, i.e. when the mobile terminals are uniformly distributed around the base station and the angular spreading of the multiple paths is negligible, the use of a smart antenna as described above can reduce the interference level by the number of main lobes (e.g. by 2 in the example of FIG. 3).

Despite the interference reduction they imply, there is a problem with smart antennas in that they also reduce the number of multiple paths each mobile terminal can receive. Indeed, since they transmit mainly in one lobe with respect to a particular mobile terminal, they do not generate significant multiple paths in directions outside of the angular width of said lobe. The angular diversity is thus reduced.

An object of the present invention is to overcome this angular diversity reduction.

Another object of the invention is to alleviate fading, possibly while ensuring interference reduction simultaneously.

SUMMARY OF THE INVENTION

The invention proposes a method of transmitting from a base station to a receiver, the base station comprising first radiating means arranged for transmitting according to an antenna pattern with respect to the receiver and further comprising second radiating means arranged for transmitting according to the same antenna pattern as the first radiating means with respect to the receiver, the transmissions of the first and second radiating means being time shifted by a determined duration.

Therefore, the receiver receives time shifted copies of the same signal, which allows it to determine the information transmitted more efficiently, by virtue of time diversity, thus alleviating the fading phenomenon.

The determined duration is advantageously set so that the correlation factor between the transmissions of the first and second radiating means is below a predetermined level. Alternatively or in addition, the determined duration can be set so that the inter-symbol interference between the transmissions of the first and second radiating means is below a predetermined level. The determined duration can thus be chosen so as to achieve an acceptable compromise between these two constraints.

In a particular embodiment, the first and/or second radiating means could comprise a plurality of radiating elements, like in the case of smart antennas. In this situation, the radiating elements can be arranged for transmitting a signal with respective phase shifts, the phase shifts being set so as to define a direction of said antenna pattern with respect to the receiver. Alternatively or in addition, the radiating elements can be arranged for transmitting a signal with respective amplitude weights, the amplitude weights being set so as to define a width of said antenna pattern with respect to the receiver.

Although the first and second radiating means could be the same (the radiating means thus transmits twice with a certain delay between both transmissions), most often they will be different.

Advantageously, the first and second radiating means can be spatially separated, so as to provide space diversity and/or they can be distinctly polarized, so as to provide polarization diversity. This ensures a certain level of decorrelation between both transmissions which improves the quality of reception.

The invention also proposes a base station comprising first radiating means arranged for transmitting according to an antenna pattern with respect to a receiver and further comprising second radiating means arranged for transmitting according to the same antenna pattern as the first radiating means with respect to the receiver, the transmissions of the first and second radiating means being time shifted by a determined duration.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

The invention is illustrated here in its application to a base station of a radiocommunication system, in relation with a mobile terminal. Of course, other kinds of transmitters or receivers could implement the invention as well. In particular, the bases station could be the one of a satellite system. As for the receiver, it could be another base station, a base station controller, a radio network controller, etc.

Figure 4:
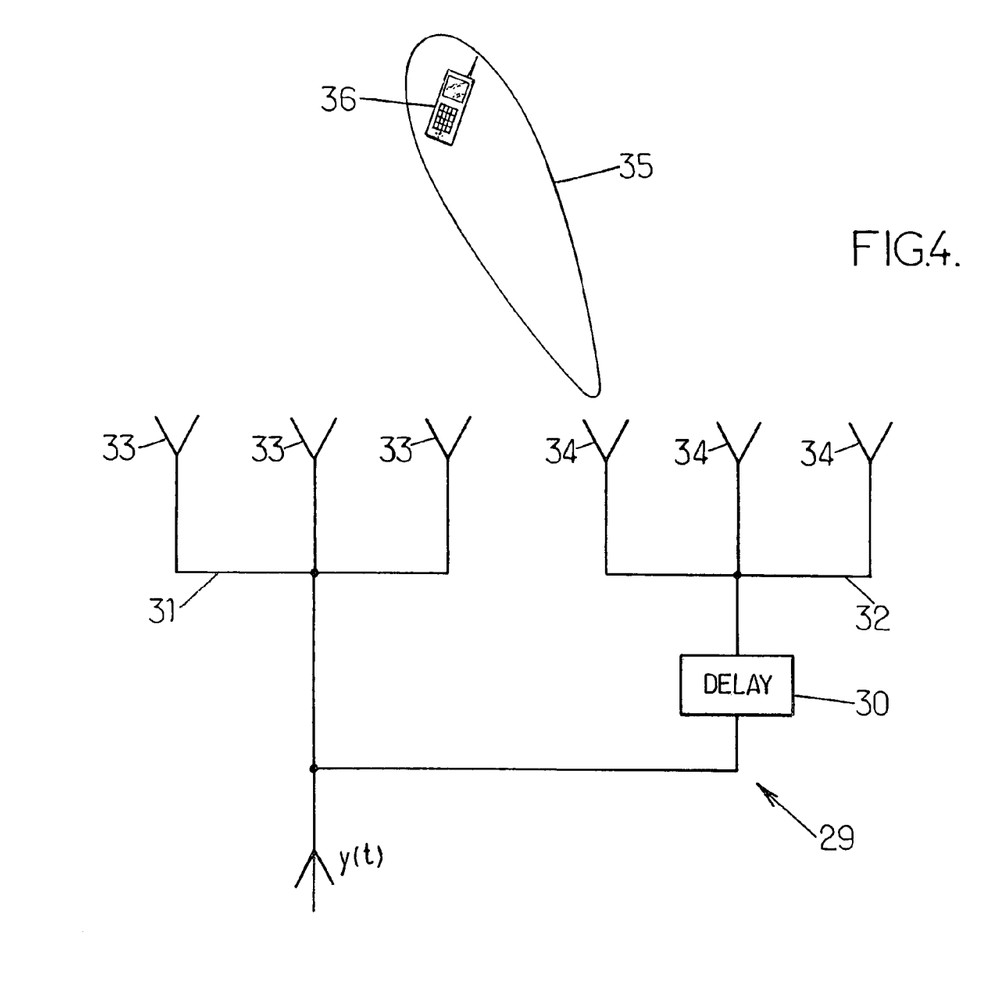
FIG. 4 is a representation of a transmission system according to the invention.

FIG. 4 diagrammatically shows a base station according to the invention. The detailed processing means have not been reproduced in the figure, but they could be similar to the ones described with reference to FIG. 2 for instance.

As shown in FIG. 4, the base station 29 comprises two radiating means 33 and 34. These radiating means can have any form. For instance, they could each consist in several antennas with respective orientations, in a single antenna (or a limited number of antennas) capable of transmitting in several directions by virtue of mechanical means, such as an articulated support, or in a plurality of radiating elements of an adaptive array antenna or smart antenna. In any case, each radiating means should be arranged so as to be able to transmit according to a determined antenna pattern with respect to a receiver.

Like in the prior art, the antenna pattern is preferably defined so as to maximize the signal-to-interference ratio for a given mobile terminal. In the illustrated example, the first group 31 of antennas 33 is thus set so as to transmit in a main lobe 35 in the range of which the mobile terminal 36 is located.

According to the invention, the second group 32 of antennas 34 transmits according to the same antenna pattern as the first group of antennas 33, with respect to the terminal 36. In other words, the second group of antennas 34 transmits mainly in the lobe 35 in the range of which the mobile terminal 36 is located.

The same signal y(t) is thus transmitted from the base station 29 to the mobile terminal 36 via both the first group of antennas 33 and the second group of antennas 34. But, the signal is delayed (reference 30) by a determined duration $\tau$ before being transmitted by the second group of antennas 34. By contrast, the signal y(t) is transmitted by the first group of antennas 33 without any delay. The transmissions of the first and second groups of antennas are thus time shifted by the duration $\tau$.

Of course, if the mobile terminal 36 moves, the antenna pattern can be modified accordingly to track the mobile terminal. In practice, the main direction of the lobe 35, and possibly its width, will thus change.

Such operation generates time diversity, since the mobile terminal 36 gets several copies of the signal y(t). This compensates to a certain extent the possible limitation of multiple paths introduced by the antenna, like in the case of a smart antenna for instance. But it can preserve other properties of the antenna, like the interference reduction in the case of smart antennas.

Another advantage of the invention is that it does not necessarily imply changes in the mobile terminal. Indeed, mobile terminals generally have means for receiving and possibly combining different copies of a transmitted signal (e.g. for determining a signal received over multiple paths) and are thus able to receive a signal transmitted according to the present invention.

Advantageously, the duration $\tau$ can be set so that the transmissions of the first and second groups of antennas are sufficiently decorrelated, i.e. the correlation factor is below a certain level. This can be achieved by analysing the impulse response of the channel over which the signal y(t) is transmitted. More particularly, a distribution of the multiple paths can be built over time, so as to determine the duration after which the most significant copies of the signal have been received by the mobile terminal. For example, the time t could be determined as the time below which 90% of the most significant copies of the signal have been received. The duration $\tau$ could thus be chosen to be more than t or equal to t. Of course, the duration $\tau$ may also differ depending on the modulation used between the base station 29 and the mobile terminal 36.

It can be shown that a duration $\tau$ of two bits, i.e. 7.38 µs, ensures a good level of the decorrelation between both transmissions in a GSM radio system. In a UMTS radio system, a duration $\tau$ of only one chip, i.e. 0.26 µs, would be suitable as well.

On the other hand, the duration $\tau$ can be set so that the inter-symbol interference between both transmissions is below a predetermined level. Indeed, the signal y(t) is sent over a radio channel in the form of symbols. If both copies of y(t) sent by each group of antennas are too time shifted, symbols sent by the second group of antennas 34 could be received by the mobile terminal 36 in a time range in which later symbols are received from the first group of antennas 33. In this situation, the mobile terminal could have difficulties in retrieving the symbols sent. The exemplary values mentioned above can ensure a correct level inter-symbol interference.

Of course, one skilled in the art could determine another duration $\tau$ in order to limit the inter-symbol interference and/or to ensure a certain level of decorrelation between the successive transmissions. This determination could be based on a theoretical approach or on a statistical approach by monitoring some counters or performance criteria as well known in the art.

Figure 5:
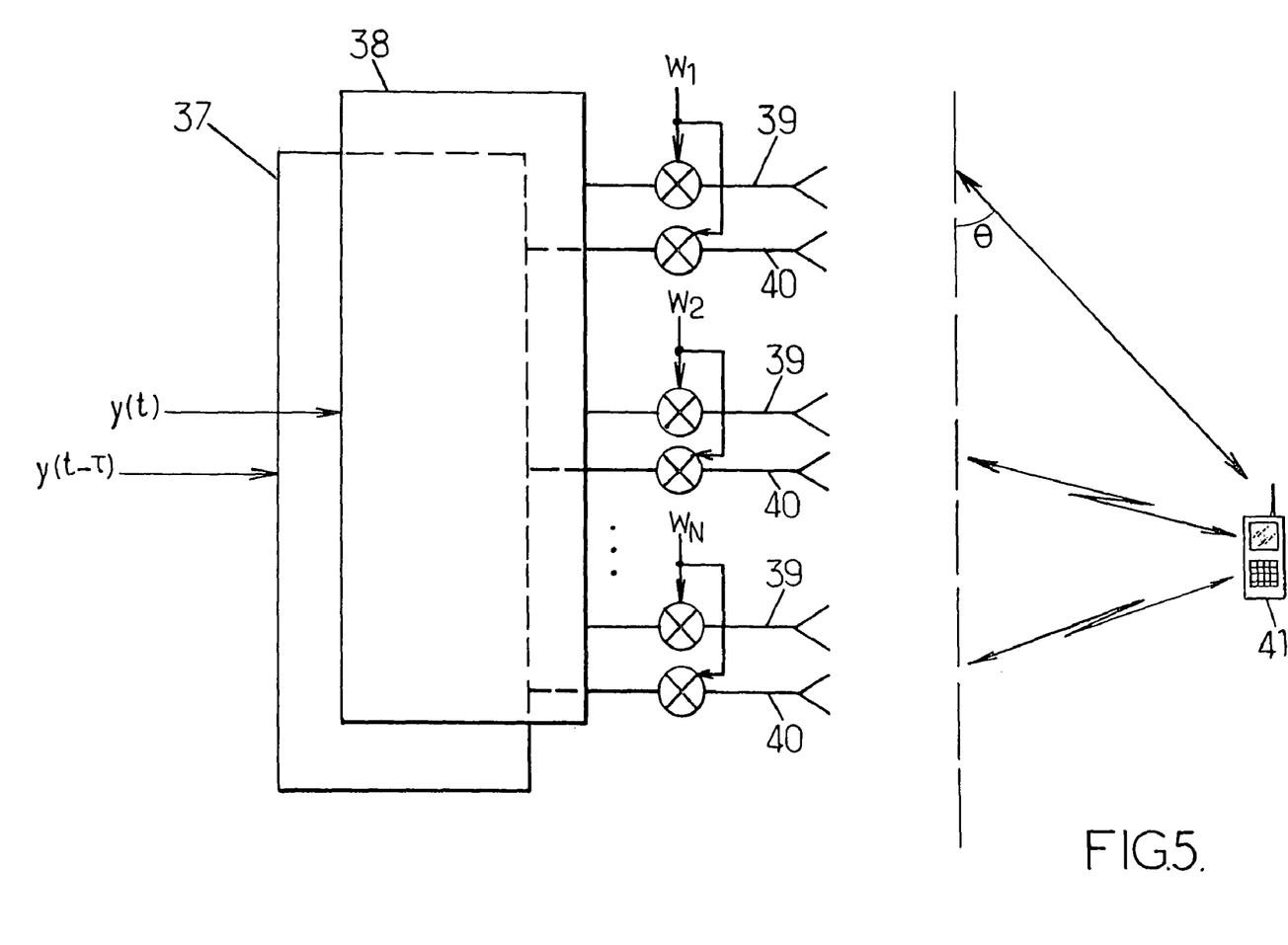
FIG. 5 is another representation of a transmission system according to the invention, using adaptive array antennas.

FIG. 5 is another representation of a transmission system according to the invention, in an example in which the first and second groups of antennas are adaptive array antennas, i.e. smart antennas. The illustrated base station comprises a first group 38 of radiating elements 39 and a second group 37 of radiating elements 40. Each radiating element, which may be of any type (large antenna, elementary source, dielectric focusing source, cross-polar antenna, etc), has a specific contribution within a transmission. The contributions generally depend on the angular position of the mobile terminal involved in the transmission with respect to the antenna. Thus, it is possible to send a signal at antenna level in a manner which favours the direction of the mobile terminal.

The signal y(t) to be transmitted to the terminal 41 by the first group 38 is sent partially by each of the N radiating elements 39 (N>1). The signal y(t) is replicated into N signals weighted by respective coefficients $w_i$ ($1 \leq i \leq N$) before being applied to the radiating elements.

In parallel, the signal y(t-$\tau$), i.e. the signal y(t) time shifted by the above mentioned duration $\tau$, is transmitted is sent partially by each of the N radiating elements 40 of the second group 37. The signal y(t-$\tau$) is replicated into N signals weighted by respective coefficients $w'_i$ ($1 \leq i \leq N$) before being applied to the radiating elements 40.

The coefficients $w_i$ are set so that the first group 38 of radiating elements 39 transmits according to an antenna pattern directed to the terminal 41. The coefficients $w'_i$ are set so that the second group 37 of radiating elements 40 transmits according to the same antenna pattern as the first group 38, directed to the terminal 41. In the illustrated example, the coefficients $w_i$ and $w'_i$ are equal to each other. Of course, they could also differ from each other if requested to obtain a common antenna pattern for both groups of radiating elements. This can be the case, e.g. when the first and second groups of radiating elements are distant from each other or oriented differently.

In a particular example, the coefficients $w_i$ and $w'_i$ are complex coefficients whose argument depends on the angular position θ of the mobile terminal 41 with respect to the antenna. If $d_i$ denotes the distance, calculated as a number of λ/2 (λ being the radio wavelength), which separates the $(i+1)^{th}$ radiating element from the first radiating element of the first group 38 of radiating elements 39, these two elements send with a geometrical phase shift of $2\pi \cdot d_i \cdot \cos(\theta)/\lambda$. The base station may thus take the coefficients $w_i$ of the form:

$$w_i = \frac{1}{\sqrt{N}} \times e^{-j\pi \cdot d_i \cdot \cos(\theta)}.$$

A similar expression may be used with regard to the coefficients $w'_i$.

However, other expressions of the contributions $w_i$ and/or $w'_i$ may be used, in the case of adaptive array antennas, e.g. to minimize the contributions of the other signals in directions other than the useful signal.

As mentioned above, not only the respective phase shifts, but also the respective amplitude weights of the signal sent could be different for each radiating element 39 or 40, so as to define a determined width of the antenna pattern with respect to the mobile terminal 41.

At the mobile terminal level, the two copies of y(t) (i.e. y(t) and y(t-τ)) are taken into account in order to determine the information sent by the base station. This can be achieved by combining the two copies as it is usually done for multiple paths. If the mobile terminal is provided with a rake receiver whose fingers detect different copies of a signal, one or several fingers of the rake could be used for the reception of the signal y(t) sent by the first group 38 of radiating elements 39, whereas another or several others fingers of the rake could be used for the reception of the signal y(t-τ) sent by the second group 37 of radiating elements 40.

It can be noted that the antennas as described hitherto make it possible to send, but also to receive in a way which is more favourable in the direction of the relevant mobile terminal. When receiving, that is to say in the uplink sense, from the mobile terminal 41 to the base station, the radiating elements are used as sensors. Signals are picked up by these elements and are subsequently weighted by respective coefficients $w_i$, and also $w'_i$ if both groups of antennas are used for reception. The signals thus weighted can then be summed to retrieve the useful signal y(t) (possibly after a combination of the retrieved signals y(t) and y(t-τ)).

Advantageously, the first and second radiating means provide a further type of diversity, so that their respective transmissions are decorrelated. For instance, space diversity can be carried out by spatially separating the first and second radiating means as will be appreciated by one skilled in the art. Alternatively or in addition, polarization diversity could be used by distinctly polarizing the first and second radiating means. This case is illustrated in the example described below with reference to FIG. 6.

Figure 6:
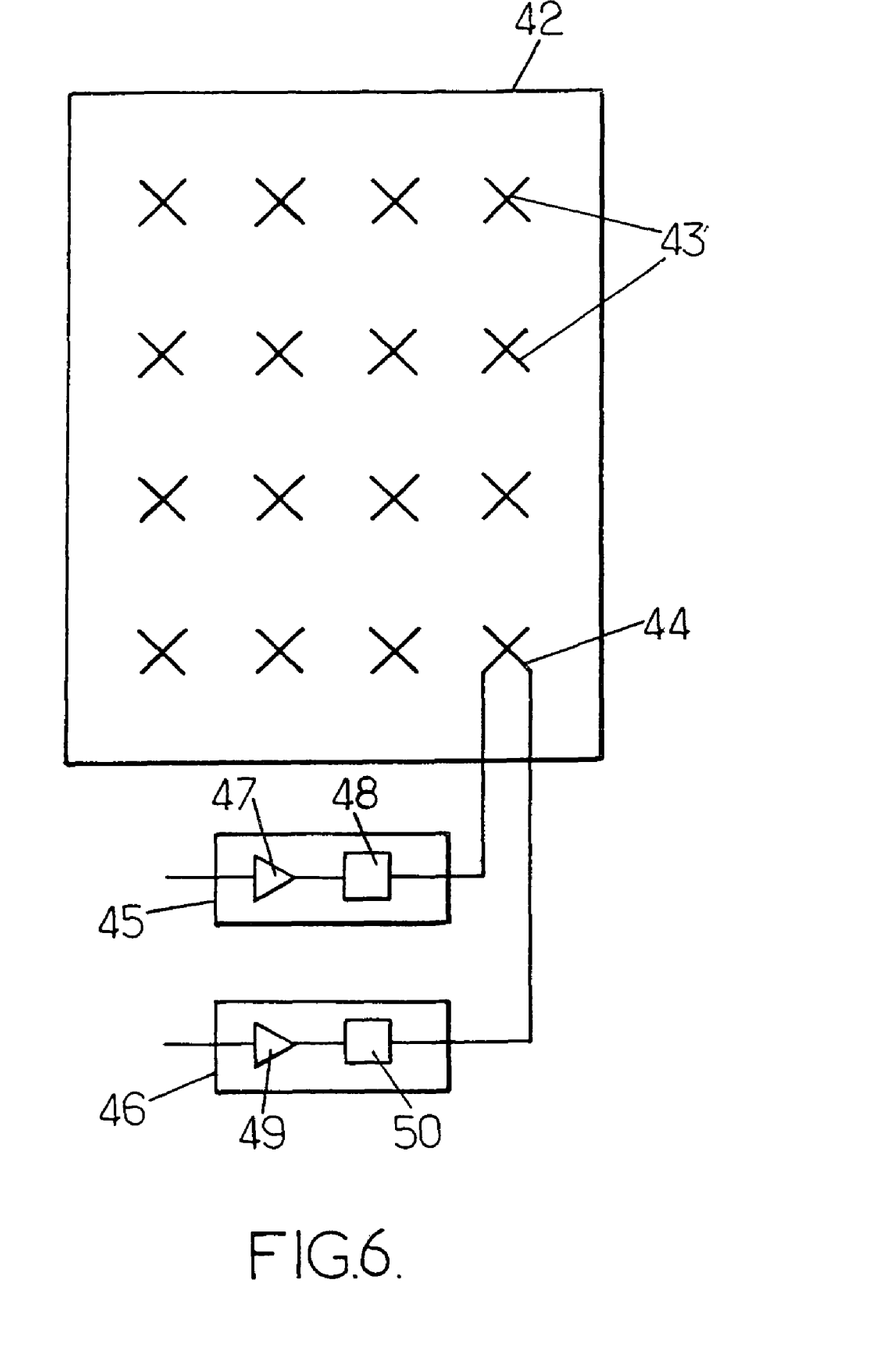
FIG. 6 illustrates a panel antenna which can be used according to the invention.

In this example, the base station comprises a panel antenna 42 provided with a plurality of cross dipoles 43. Each cross dipole includes a radiating element with a +45° polarization and a radiating element with a −45° polarization, i.e. orthogonal polarizations. As more particularly shown with regard to the dipole 44, each radiating element of the dipole receives a different part of the signal to be transmitted via a respective cell 45 or 46. The cell comprises an amplifier 47 or 49 which can be followed by a duplexer 48 or 50. The amplification is thus performed very close to the corresponding radiating element in this example.

Of course, the total power of the signal to be transmitted is shared between both radiating elements constituting the dipole. The power can be equally shared between both radiating elements constituting the dipole. It is also possible to distribute the total power of the signal to be transmitted differently between both radiating elements constituting the dipole. For example, the transmission power can be set according to the reception power on each radiating element constituting the dipole. The power distribution can thus be estimated on the uplink and then applied to the downlink. This technique can be used not only in the case of FIG. 6. But it is particularly useful when the radiating elements are polarized differently, because the different transmission powers can thus compensate the different polarizations in a way.

With this architecture, it could be decided that all the radiating elements with a +45° polarization are provided with a non-delayed signal to be transmitted to a receiver, whereas all the radiating elements with a −45° polarization are provided with a delayed signal to be transmitted to a receiver, according to the principles described above. Therefore, the two time shifted transmissions use orthogonal polarizations, thus providing a better decorrelation with each other.

We claim:

1. A method of transmitting from a base station to a receiver, the base station comprising a first antenna assembly and a second antenna assembly, the method comprising:
    transmitting, by the first antenna assembly having plural radiating elements, a signal according to an antenna pattern with respect to the receiver;
    transmitting, by the second antenna assembly having plural radiating elements, the signal with a time delay according to the same antenna pattern as the first antenna assembly with respect to the receiver,
    wherein the signal and the signal with the time delay transmitted by the respective first and second antenna assemblies are time shifted with respect to each other by a determined duration.

2. A method as claimed in claim 1, wherein said determined duration is set so that a correlation factor between transmissions of the first and second antenna assemblies is below a predetermined level.

3. A method as claimed in claim 1, wherein said determined duration is set so that the inter-symbol interference between transmissions of the first and second antenna assemblies is below a predetermined level.

4. A method as claimed in claim 1, wherein the radiating elements of each of the first and second antenna assemblies are arranged for transmitting signal components with respective phase shifts, the phase shifts being set so as to define a direction of said antenna pattern with respect to the receiver.

5. A method as claimed in claim 1, wherein the radiating elements of each of the first and second antenna assemblies are arranged for transmitting signal components with respective amplitude weights, the amplitude weights being set so as to define a width of said antenna pattern with respect to the receiver.

6. A method as claimed in claim 1, wherein the first and second antenna assemblies are spatially separated, so as to provide space diversity.

7. A method as claimed in claim 1, wherein the first and second antenna assemblies are distinctly polarized, so as to provide polarization diversity.

8. A method as claimed in claim 7, wherein each radiating element of the first antenna assembly is coupled to a respective radiating element of the second antenna assembly, so as to form a cross dipole with orthogonal polarizations.

9. A base station comprising:
- a first antenna assembly having plural radiating elements arranged for transmitting a signal according to an antenna pattern with respect to a receiver;
- a second antenna assembly having plural radiating elements arranged for transmitting the signal with a time delay according to the same antenna pattern as the first antenna assembly with respect to the receiver,
- wherein the signal and the signal with the time delay transmitted by the respective first and second antenna assemblies are time shifted with respect to each other by a determined duration.

10. A base station as claimed in claim 9, wherein said determined duration is set so that a correlation factor between transmissions of the first and second antenna assemblies is below a predetermined level.

11. A base station as claimed in claim 9, wherein said determined duration is set so that the inter-symbol interference between transmissions of the first and second antenna assemblies is below a predetermined level.

12. A base station as claimed in claim 9, wherein the radiating elements of each of the first and second antenna assemblies are arranged for transmitting signal components with respective phase shifts, the phase shifts being set so as to define a direction of said antenna pattern with respect to the receiver.

13. A base station as claimed in claim 9, wherein the radiating elements of each of the first and second antenna assemblies are arranged for transmitting signal components with respective amplitude weights, the amplitude weights being set so as to define a width of said antenna pattern with respect to the receiver.

14. A base station as claimed in claim 9, wherein the first and second antenna assemblies are spatially separated, so as to provide space diversity.

15. A base station as claimed in claim 9, wherein the first and second antenna assemblies are distinctly polarized, so as to provide polarization diversity.

16. A base station as claimed in claim 15, wherein each radiating element of the first antenna assembly is coupled to a respective radiating element of the second antenna assembly, so as to form a cross dipole with orthogonal polarizations.

* * * * *